US012061732B2

(12) United States Patent
Hubis

(10) Patent No.: US 12,061,732 B2
(45) Date of Patent: *Aug. 13, 2024

(54) MANAGING ENCRYPTION KEYS PER LOGICAL BLOCK ON A PERSISTENT MEMORY DEVICE

(71) Applicant: Micron Technology, Inc., Boise, ID (US)

(72) Inventor: Walter Andrew Hubis, Westminster, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,950

(22) Filed: May 18, 2023

(65) Prior Publication Data
US 2023/0289483 A1 Sep. 14, 2023

Related U.S. Application Data

(63) Continuation of application No. 17/195,061, filed on Mar. 8, 2021, now Pat. No. 11,704,444.

(51) Int. Cl.
*G06F 21/79* (2013.01)
*G06F 21/60* (2013.01)
(Continued)

(52) U.S. Cl.
CPC ............ *G06F 21/79* (2013.01); *G06F 21/602* (2013.01); *G06F 21/805* (2013.01); *G06F 21/107* (2023.08)

(58) Field of Classification Search
CPC ...... G06F 21/79; G06F 21/602; G06F 21/805; G06F 21/107; G06F 21/6272;
(Continued)

(56) References Cited

U.S. PATENT DOCUMENTS 8,005,227 B1   8/2011  Linnell et al.
8,799,681 B1 *  8/2014  Linnell ............... G06F 21/6218
                                                713/193
(Continued)

FOREIGN PATENT DOCUMENTS

CN       1698305         11/2005
CN     101026455 A        8/2007
(Continued)

OTHER PUBLICATIONS

"Chinese Application Serial No. 202210208139.X, Office Action mailed Dec. 27, 2023", with English translation, 9 pages.
(Continued)

*Primary Examiner* — Philip J Chea
*Assistant Examiner* — Sangseok Park
(74) *Attorney, Agent, or Firm* — Schwegman Lundberg & Woessner, P.A.

(57) ABSTRACT

A command to perform a data operation at a memory device is received. The command includes an encryption key tag. A first key table is accessed from local memory. The first key table includes a first set of key entries corresponding to a first set of encryption keys. The first key table is searched to determine whether it includes an entry corresponding to the encryption key tag. Based on determining the first key table does not include an entry corresponding to the tag, a second key table is accessed from RAM. The second key table includes a second set of key entries corresponding to a second set of encryption keys. A key entry corresponding to the encryption key tag is identified from the second key table. The key entry includes an encryption key corresponding to the encryption key tag. The command is processed using the encryption key.

20 Claims, 12 Drawing Sheets

(51) Int. Cl.
*G06F 21/80* (2013.01)
*G06F 21/10* (2013.01)

(58) Field of Classification Search
CPC ... G06F 21/72; H04L 63/0876; H04L 63/045; H04L 9/0861; H04L 9/0894; H04L 2463/062
See application file for complete search history.

(56) References Cited

U.S. PATENT DOCUMENTS

| | | | |
|---|---|---|---|
| 11,704,444 | B2 | 7/2023 | Hubis |
| 2008/0267410 | A1 | 10/2008 | Dellow |
| 2013/0223628 | A1 | 8/2013 | Cho et al. |
| 2022/0029793 | A1* | 1/2022 | Kachare .............. G06F 13/1668 |
| 2022/0284135 | A1 | 9/2022 | Hubis |

FOREIGN PATENT DOCUMENTS

| | | |
|---|---|---|
| CN | 101611631 A | 12/2009 |
| CN | 102238002 A | 11/2011 |
| CN | 105847011 | 8/2016 |
| CN | 105933318 A | 9/2016 |
| CN | 109587106 A | 4/2019 |
| CN | 111353156 A | 6/2020 |
| CN | 112434325 A | 3/2021 |
| CN | 115051821 A | 9/2022 |
| DE | 102018115491 A1 | 3/2019 |

OTHER PUBLICATIONS

Xiang, Fei, et al., "Research on ciphertext search for the cloud environment", Journal on Communications vol. 34 No. 7, 11 pgs.

U.S. Appl. No. 17/195,061 U.S. Pat. No. 11,704,444, filed Mar. 8, 2021, Managing Encryption Keys per Logical Block on a Persistent Memory Device.

U.S. Appl. No. 17/195,061, Non Final Office Action mailed Aug. 10, 2022, 20 pgs.

U.S. Appl. No. 17/195,061, Response filed Nov. 10, 2022 to Non Final Office Action mailed Aug. 10, 2022, 11 pgs.

U.S. Appl. No. 17/195,061, Notice of Allowance mailed Feb. 21, 2023, 8 pgs.

"Chinese Application Serial No. 202210208139.X, Office Action mailed Apr. 20, 2024", with English translation, 8 pages.

* cited by examiner

MANAGING ENCRYPTION KEYS PER LOGICAL BLOCK ON A PERSISTENT MEMORY DEVICE

PRIORITY APPLICATION

This application is a continuation of U.S. application Ser. No. 17/195,061, filed Mar. 8, 2021, which is incorporated herein by reference in its entirety.

TECHNICAL FIELD

Embodiments of the disclosure relate generally to memory sub-systems and, more specifically, to managing encryption keys per logical block on a persistent memory device in a memory sub-system.

BACKGROUND

A memory sub-system can include one or more memory devices that store data. The memory components can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
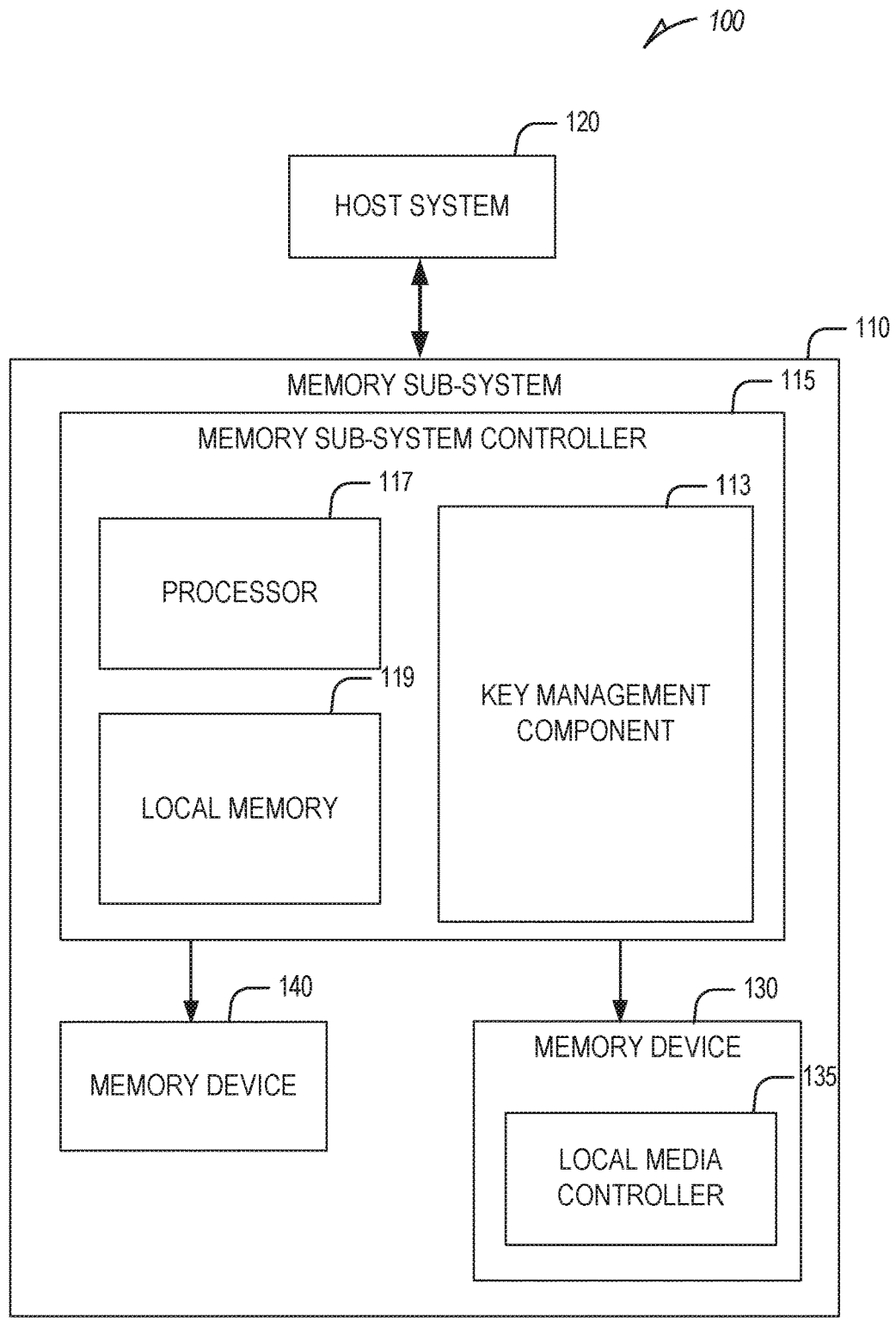
FIG. 1 illustrates an example computing environment that includes a memory sub-system, in accordance with some embodiments of the present disclosure.

Aspects of the present disclosure are directed to managing encryption keys per logical block on a persistent memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a negative-and (NAND) memory device. Other examples of non-volatile memory devices are described below in conjunction with FIG. 1. Some memory devices, such as NAND memory devices, include an array of memory cells (e.g., flash cells) to store data. Each cell includes a transistor, and within each cell, data is stored as the threshold voltage of the transistor. Memory cells in these devices can be grouped as pages that can refer to a logical unit of the memory device used to store data. For example, memory cells in NAND memory devices are connected horizontally at their control gates to a word line to form a page. With some types of memory devices (e.g., NAND), pages are grouped to form blocks (also referred to herein as "memory blocks").

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

Current storage methodologies add additional information known as metadata to user data. This metadata is stored along with the user data into the persistent memory of a memory device. That metadata is retrieved when the user data is requested by the host system. Currently, metadata is typically used to add protection information to the user data that allows the memory sub-system to determine if the user data has been corrupted or if the correct data is being returned.

Data encryption boundaries on memory devices are becoming increasingly granular. Initially, an entire memory device was encrypted using a single encryption key. That was followed by technologies such as the Trusted Computing Group Opal Specification which allowed a large number of encryption bands to be established on a device, each with a separate encryption key. Current technologies and initiatives now allow each logical block on the memory device to have its own key. This increasingly small encryption granularity is being driven by initiatives like the European Union's General Data Protection Regulations' (GDPR) "Right to be forgotten", containerization of applications in cloud storage services where data must be securely partitioned, and many other applications.

This new approach to data encryption on memory devices creates challenges in key management. For example, with these contemporary approaches to data encryption, it is a challenge to identify a key that was used to encrypt data to assure that the correct key is used to decrypt that data. Further, keys need to be quickly accessible, since the data encryption (write operations) and decryption (read operations) are part of the primary data path of the memory device and will have a significant impact on the performance of the device.

Aspects of the present disclosure address encryption key management on a per logical block basis by maintaining key tables that track encryption keys within a memory sub-system using key tags and key identifiers. More specifically, a key table maintained by the memory sub-system includes a set of key entries, and each key entry includes an encryption key, and a key identifier associated with the encryption key. The key table is indexed by key tag and key tags are used by the memory sub-system to perform quick look-up for encryption keys. Each key identifier is a world-wide unique identifier of a corresponding encryption key. The world-wide unique key identifier of a key used to encrypt user data can be added to metadata that can be used to assure that the correct key is available to decrypt the user data. In addition, to provide rapid access to a large number of keys, the memory sub-system further utilizes a key cache that is used to store a large number of keys that can be accessed quickly.

Key corruption can occur through a variety of mechanisms, including transient errors and firmware coding errors. While it may not be possible for the memory sub-system to determine if the wrong key is being used for write operations, it is possible for the memory sub-system to determine if the wrong key is being used to read the data. To do this, the key identifier is stored with the encrypted data and checked when the data is read back to determine if it matches the key identifier being used to decrypt the data.

By utilizing the key table in the manner described herein, the memory sub-system enables each logical block on the memory device to have its own encryption. Utilization of a key cache further enables the memory sub-system to maintain a large number of keys and access them quickly without significantly impacting device performance.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include multiple host systems that are coupled to one or more memory sub-systems 110. In some embodiments, the host system 120 is coupled to different types of memory sub-system 110. FIG. 1 illustrates an example host system 120 that is coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

Each host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 may use the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. Either of the host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. For example, memory cells in NAND memory devices are connected horizontally at their control gates to a word line to form a page. With some types of memory (e.g., NAND), pages can be grouped to form blocks. Additionally, word lines within a memory device can be organized into multiple word line groups, each of which includes one or more word lines, though each word line group includes fewer word lines than are included in a block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application-specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controller 135 that operates in conjunction with memory sub-system controller 115 to execute operations on one or more memory cells of the memory devices 130.

The memory sub-system 110 also includes a key management component 113 that is responsible for managing encryption keys on a per-block basis. As an example, when a command for a data operation is received by the memory sub-system 110, the key management component 113 identifies an encryption key to be used to perform a cryptographic operation in furtherance of the data operation based on a key tag included with the command. For write operations, the identified encryption key is used to encrypt data that is written to one of the memory devices 130 or 140, and for read operations, the identified encryption key is used to decrypt encrypted data read from one of the memory devices 130 or 140. The encryption key can be specifically associated with a block or other logical unit to which data is written or from which data is read. The key management component 113 utilizes a key cache that is used to store a large number of keys that can be accessed quickly. Further details with regards to the multi-level key cache and operations of the key management component 113 are described below.

In some embodiments, the memory sub-system controller 115 includes at least a portion of the key management component 113. For example, the memory sub-system controller 115 can include a processor 117 (processing device) configured to execute instructions stored in local memory 119 for performing the operations described herein. In some embodiments, at least a portion of the key management component 113 is part of the host system 120, an application, or an operating system.

Figure 2:
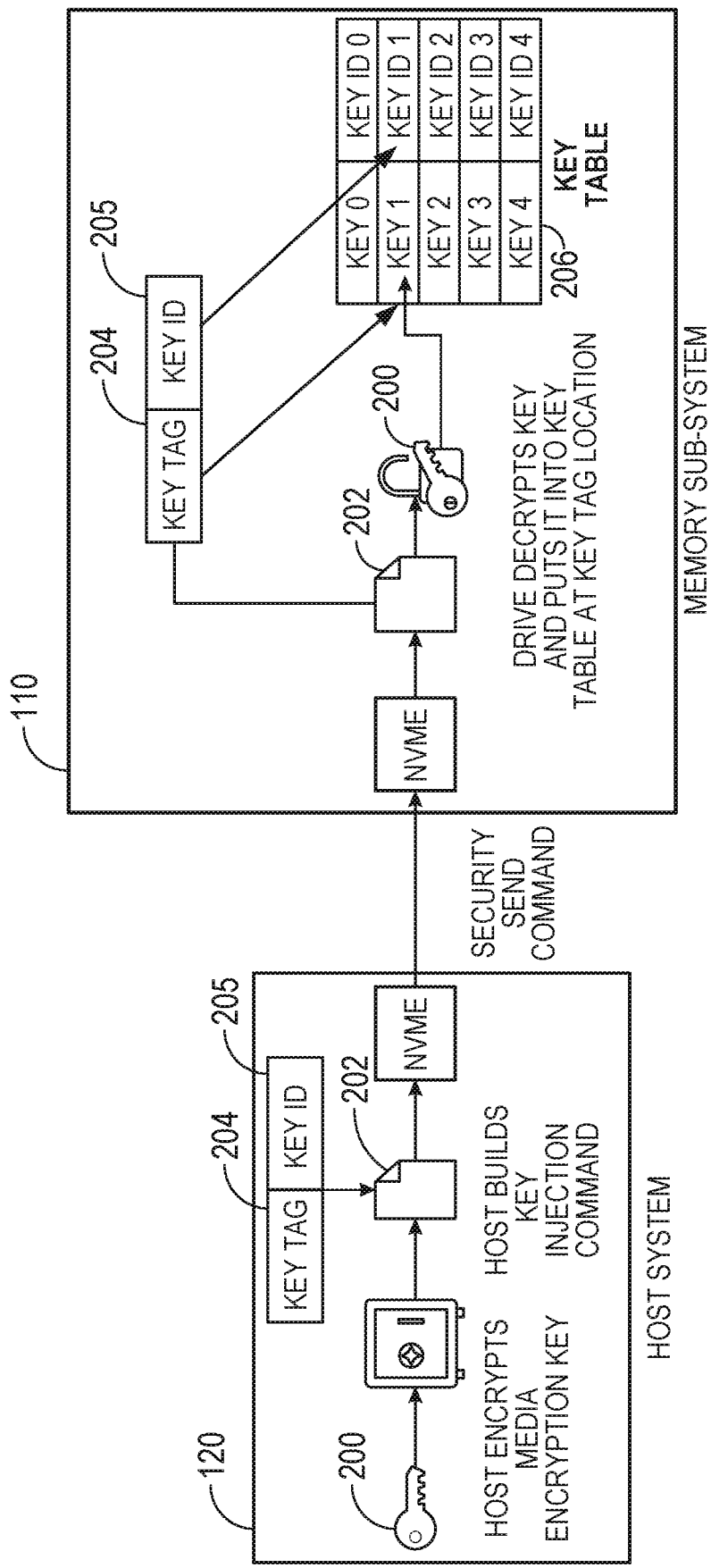
FIG. 2 is a block diagram illustrating operations of the memory sub-system in performing a key injection, in accordance with some embodiments.

FIG. 2 is a block diagram illustrating operations of the memory sub-system controller 115 in performing a key injection, in accordance with some embodiments. As shown, the host system 120 encrypts an encryption key 200 and generates a key injection command 202 that includes the encrypted encryption key 200, a key tag 204, a key identifier 205, and information about how the encryption key 200 is encrypted. The host system 120 provides the key injection command 202 to the memory sub-system controller 115.

Based on receiving the key injection command 202, the key management component 113 decrypts the encryption key 200 and injects a new key entry for the encryption key 200 into key table 206. The key table 206 can include a set of key entries indexed by key tag and each key entry includes an encryption key and a key identifier. Accordingly, the new key entry includes the encryption key 200 and the key identifier 205 included in the key injection command 202. The key entry for the encryption key 200 is inserted into the key table 206 at the index defined by the key tag 204.

Figure 3:
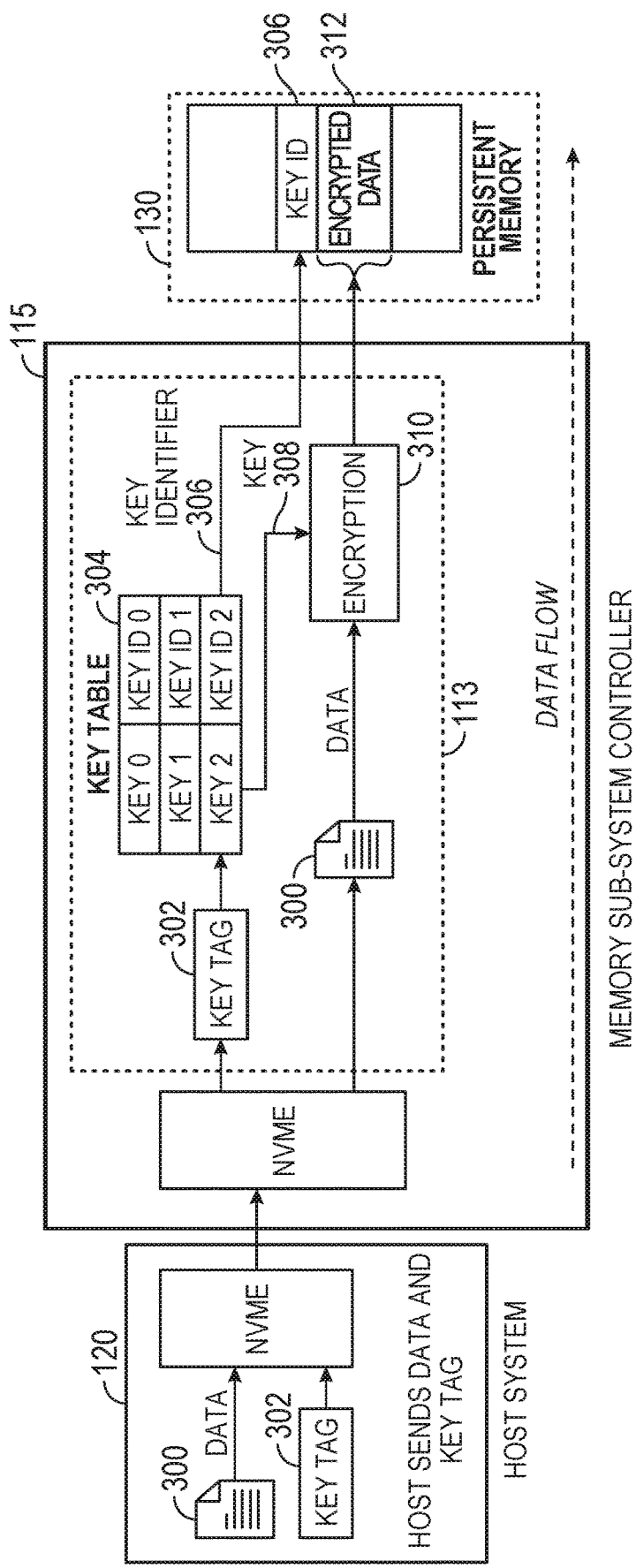
FIG. 3 is a block diagram illustrating operations of the memory sub-system in performing a write operation, in accordance with some embodiments of the present disclosure.

FIG. 3 is a block diagram illustrating operations of the memory sub-system 110 in performing a write operation, in accordance with some embodiments of the present disclosure. As shown, the host system 120 provides a command to the memory sub-system controller 115 that includes data 300 and a key tag 302 associated with an encryption key. In response to receiving the command, the key management component 113 of the memory sub-system controller 115 searches a key table 304 to identify a key entry that corresponds to the key tag 302. The key entry in the key table 304 that matches the key tag 302 includes a key identifier 306 and an encryption key 308. An encryption component 310 of the key management component 113 encrypts the data 300 using the encryption key 308 corresponding to the matching entry in the key table 304, and the memory sub-system controller 115 stores encrypted data 312 along with the key identifier 306 in the memory device 130.

Figure 4A:
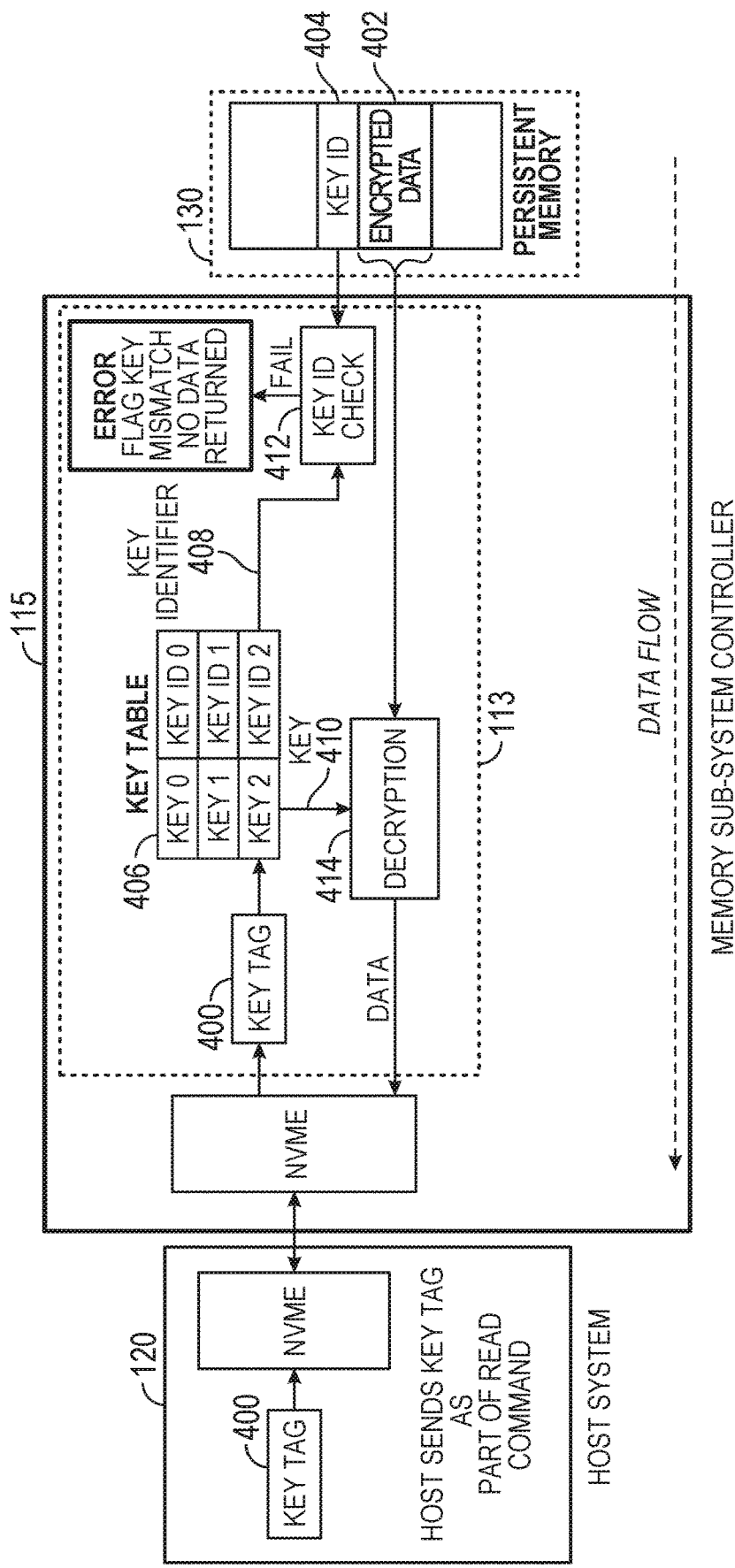
FIGS. 4A and 4B are block diagrams illustrating operations of the memory sub-system in performing a read operation, in accordance with some embodiments of the present disclosure.
Figure 4B:
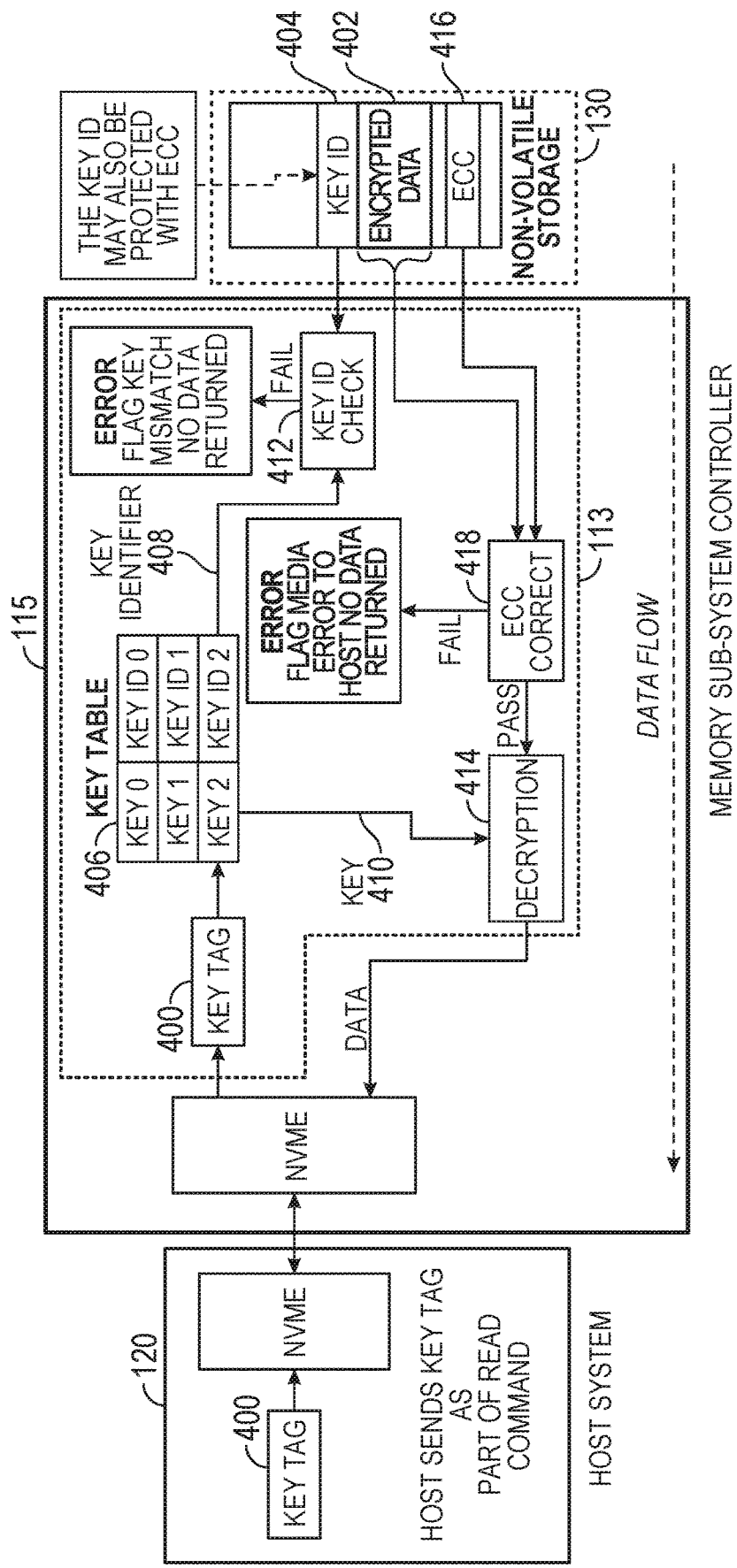

FIGS. 4A and 4B are block diagrams illustrating operations of the memory sub-system 110 in performing a read operation, in accordance with some embodiments of the present disclosure. As shown in FIG. 4A, the host system 120 provides a command to the memory sub-system controller 115 to read data from the memory device 130. The command includes a key tag 400 associated with an encryption key. In response to the command, the memory sub-system controller 115 reads encrypted data 402 and a corresponding key identifier 404 from the memory device 130.

The key management component 113 searches a key table 406 to identify a key entry that corresponds to the key tag 400 included in the read command. The key entry in the key table 406 that matches the key tag 400 includes a key identifier 408 and an encryption key 410. Because key corruption may occur through a variety of mechanisms, including transient errors and firmware coding errors, the key identifier 408 is stored with the encrypted data 402 so that when the encrypted data 402 is read back, the key management component 113 can determine if it matches a key identifier of an encryption key to be used to decrypt the encrypted data 402. Accordingly, the key management component 113 performs a key identifier check 412 to determine whether the key identifier 408 in the key table 406 matches the key identifier 404 stored with the encrypted data 402. If the key identifier 404 and the key identifier 408 do not match, the key management component 113 returns an error message to the host system 120. If the key identifiers 404, 408 match, a decryption component 414 of the key management component 113 decrypts the encrypted data 402 using the encryption key 410.

As shown in FIG. 4B, the encrypted data 402 as well as the key identifier 404 can, in some embodiments, also be protected with error correcting code (ECC) 416. Consistent with these embodiments, an ECC check 418 is performed prior to decryption of the encrypted data 402. If the ECC check 418 fails, the memory sub-system controller 115 returns an error message to the host system 120. If the ECC check 418 passes, the encrypted data 402 is decrypted by the decryption component 414 using the encryption key 410, as described above.

Figure 5:
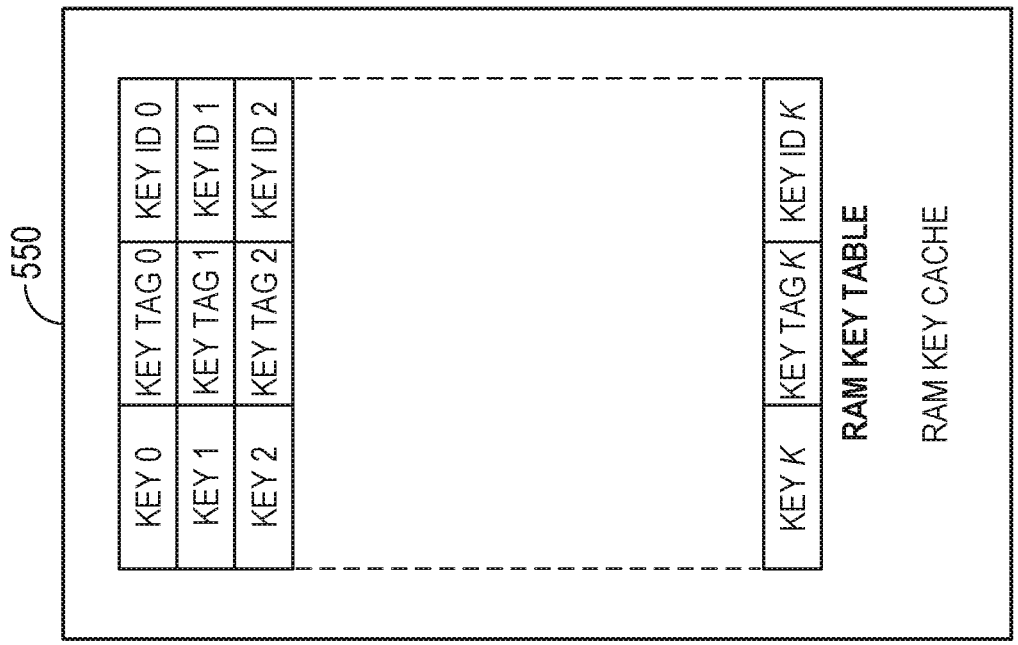
FIG. 5 is a block diagram illustrating example key cache used by the memory sub-system to manage encryption keys, in accordance with some embodiments.
Figure 5:
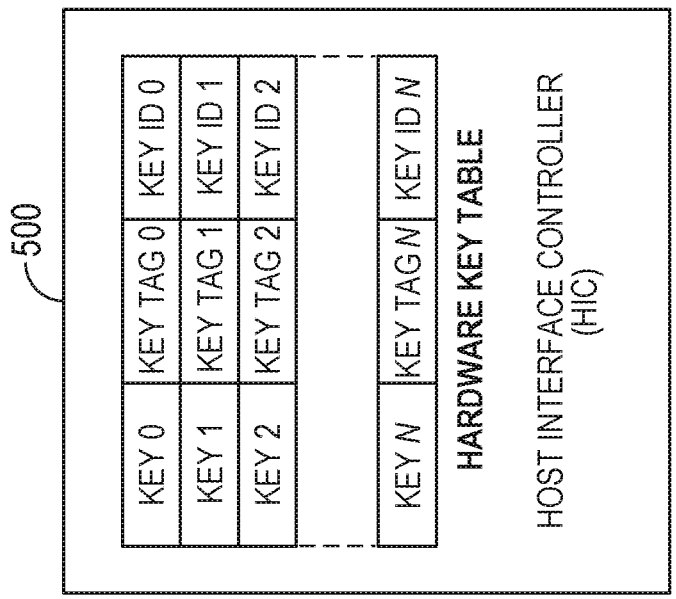

With reference to FIG. 5, an example key table and key cache used by the key management component 113 of the memory sub-system controller 115 to manage encryption keys are shown, in accordance with some embodiments. As shown, the key management component 113 can utilize two key tables. A first key table, hardware key table 500, includes a first set of key entries with n entries. Each key entry in the hardware key table 500 includes an encryption key, a key tag associated with the encryption key, and a unique identifier of the encryption key. The hardware key table 500 can be stored in local memory 119 of the memory sub-system controller 115 to provide extremely fast access to the key management component 113.

A second key table, RAM key table 550, comprises a second set of key entries that includes k entries. As with the hardware key table 500, each entry in the RAM key table 550 includes an encryption key, a key tag associated with the encryption key, and a unique identifier of the encryption key. The RAM key table 550 is a fast key cache that is substantially larger than the hardware key table 500 (e.g., k>n) but takes longer to access. Additionally, when a key requested by the host system 120 is not in the hardware key table 500, the key management component 113 transfers a new key from the RAM key table 550 into the hardware key table 500 in order to process the data operation. This RAM key table 550 can be implemented in a fast RAM close to the memory sub-system controller 115 (e.g., low access time).

Figure 6:
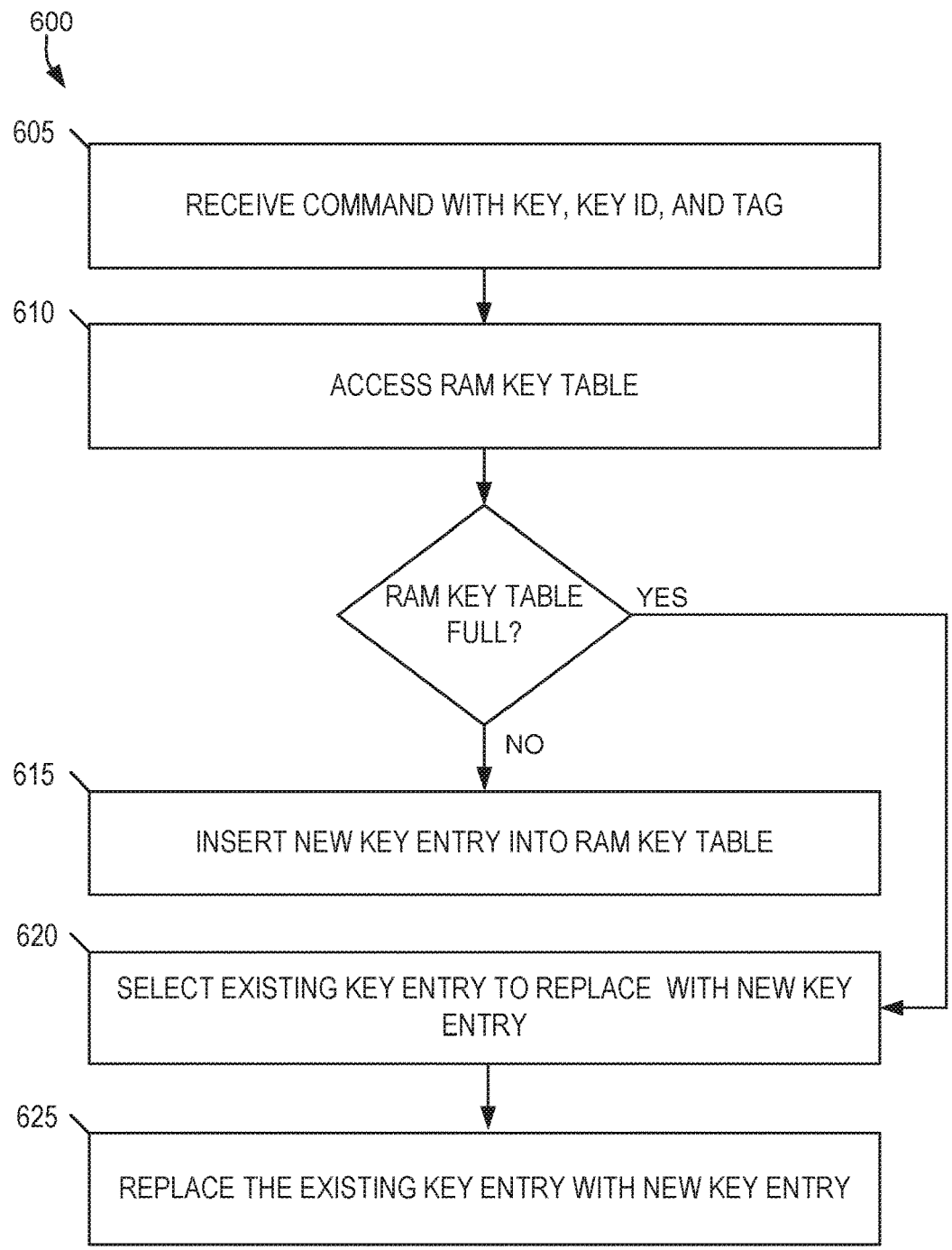
FIG. 6 is a flow diagram illustrating an example method for key injection in a memory sub-system, in accordance with some embodiments of the present disclosure.

FIG. 6 is flow diagram illustrating an example method 600 for key injection in a memory sub-system, in accordance with some embodiments of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the key management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing device receives a key injection command. The key injection command includes an encryption key, a key identifier, and a key tag. The key injection command can be received from a host system (e.g., the host system 120).

Based on receiving the key injection command, the processing device accesses a RAM key table from RAM, at operation 610. The RAM key table includes a set of key entries and each key entry includes an encryption key, a key identifier, and a key tag. The processing device inserts a new key entry into the RAM key table, at operation 615, based on the RAM key table having space available for at least one new entry. The new key entry includes the encryption key, the key identifier, and the key tag included in the key injection command.

If the RAM key table is full, the processing device selects an existing key entry in the RAM key table to replace (at operation 620), and the processing device replaces the existing key entry with the new key entry at operation 625. As an example, the processing device can select the existing key entry to replace based on a recency of use of the corresponding encryption key (e.g., a least recently used entry).

Figure 7:
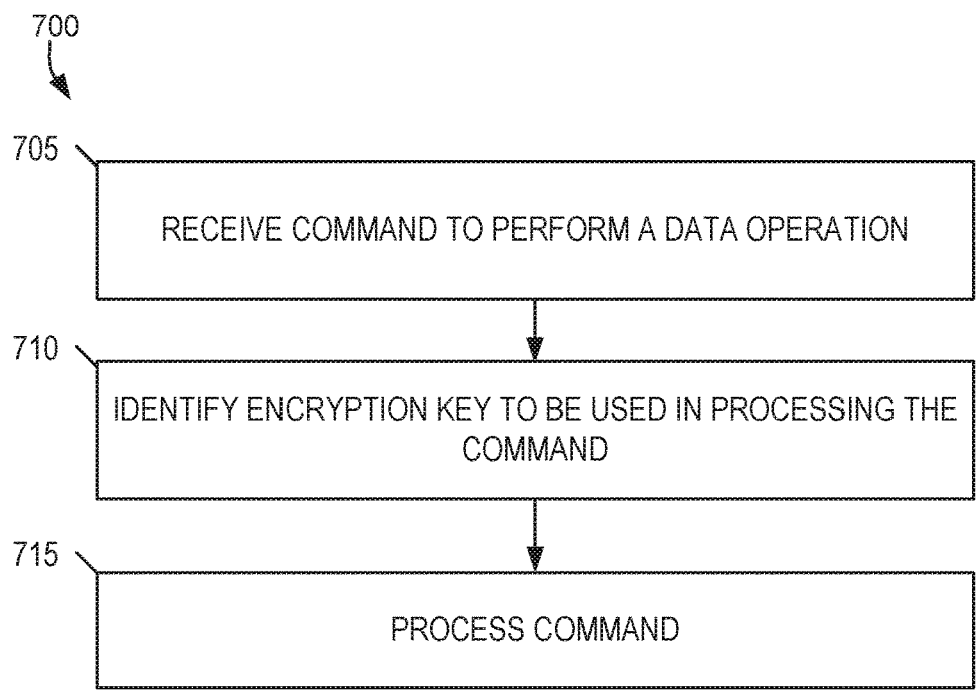
FIGS. 7, 8, 9A, and 9B is a flow diagram illustrating an example method for managing encryption keys during a data operation, in accordance with some embodiments of the present disclosure.

FIG. 7 is a flow diagram illustrating an example method for managing encryption keys during a data operation, in accordance with some embodiments of the present disclosure. The method 700 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 700 is performed by the key management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing device receives a command to perform a data operation at a memory device (e.g., the memory device 130). The command can be a command to read data from the memory device (a read command) or a command to write data to the memory device (a write command). The command includes a key tag associated with an encryption key used to process the command. The command is received from a host system (e.g., host system 120).

The processing device uses the key tag included in the command to identify the encryption key from a key table maintained by the processing device, at operation 710, and the processing device uses the encryption key to process the command at operation 715. For example, the processing device can use the encryption key to encrypt data prior to writing to the memory device or to decrypt data read from the memory device. If the processing device is unable to identify the encryption key using the key tag, the processing device returns an error in response to the command.

Figure 8:
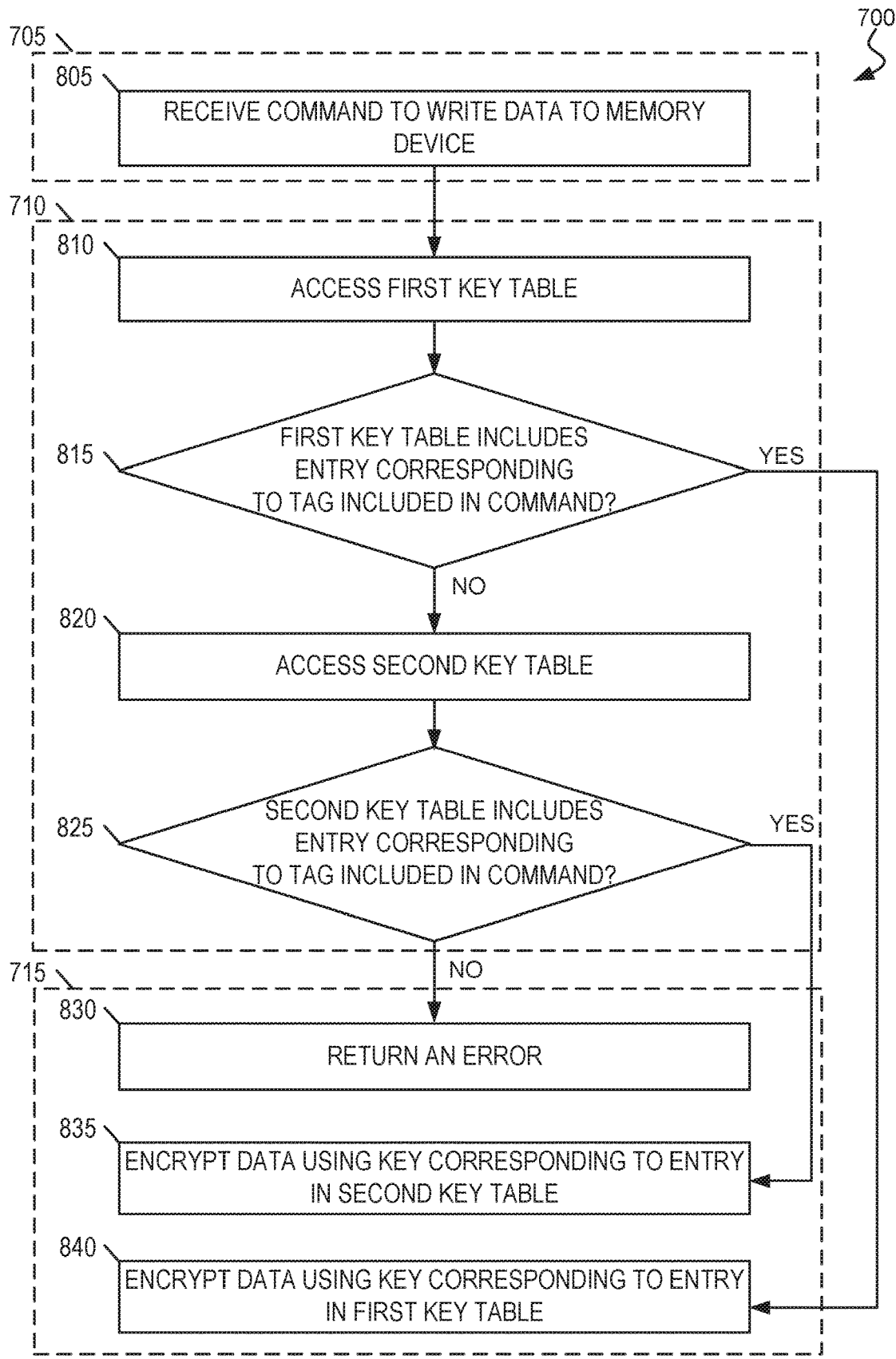

As shown in FIG. 8, the method 700 can include operations 805, 810, 815, 820, 825, 830, 835, and 840, consistent with some embodiments. Consistent with these embodiments, the operation 805 can be performed as part of the operation 705 where the processing device receives a command to perform a data operation. At operation 805, the processing device receives a command to write data to a memory device (e.g., the memory device 130). As noted above, the command includes a key tag associated with an encryption key.

Consistent with these embodiments, the operations 810, 815, 820, and 825, can be performed as part of operation 710, where the processing device identifies the encryption key using the key tag.

At operation 810, the processing device accesses a first key table (e.g., hardware key table 500) from local memory (e.g., the local memory 119). The first key table comprises a first set of key entries corresponding to a first set of encryption keys. Each key entry in the first set of key entries includes an encryption key, an identifier of the encryption key, and a tag associated with the encryption key.

The processing device searches the first key table, at operation 815, to determine whether the first key table incudes a key entry that corresponds to the key tag included in the write command. Based on determining that the first key table does not include an entry that corresponds to the key tag, the processing device accesses a second key table from RAM (e.g., RAM key table 550), at operation 820. The second key table includes a second set of key entries corresponding to a second set of encryption keys. As with the first set of key entries, each key entry in the second set of key entries includes an encryption key, an identifier of the encryption key, and a tag associated with the encryption key.

At operation 825, the processing device searches the second key table to determine whether the second key table incudes a key entry that corresponds to the key tag included in the write command.

Consistent with these embodiments, any one of the operations 830, 835, and 840 can be performed as part of the operation 715, where the processing device processes the command. Based on determining, at operation 825, that the second key table does not include an entry that corresponds to the key tag, the processing device returns an error in response to the write command, at operation 830.

Based on identifying (at operation 825) a key entry in the second key table that matches the key tag, the processing device encrypts the data using an encryption key corresponding to the matching entry in the second key table, at operation 835.

Based on identifying (at operation 815) a key entry in the first key table that matches the key tag, the processing device encrypts the data using an encryption key corresponding to the matching entry in the first key table, at operation 840.

Figure 9A:
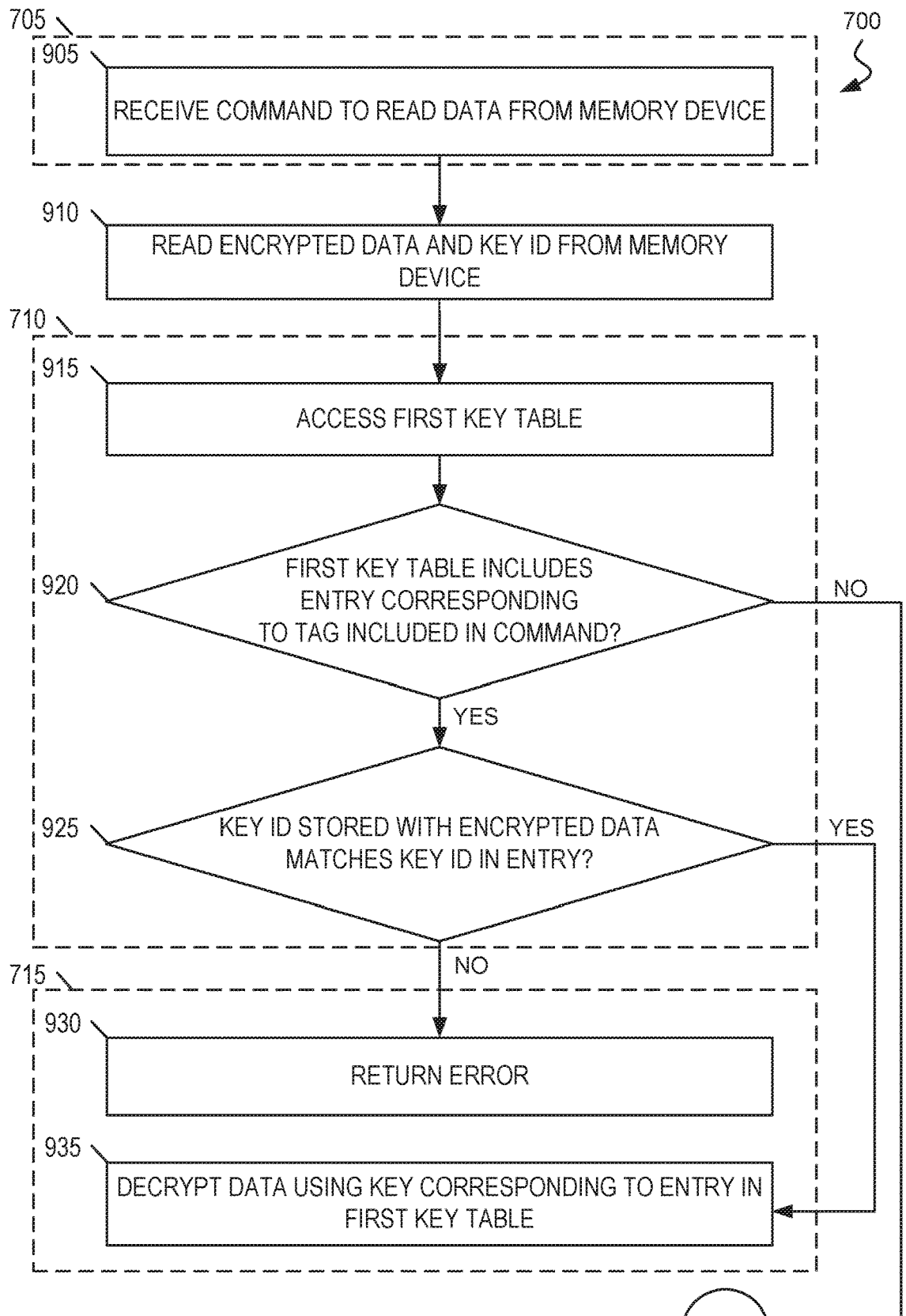
Figure 9B:
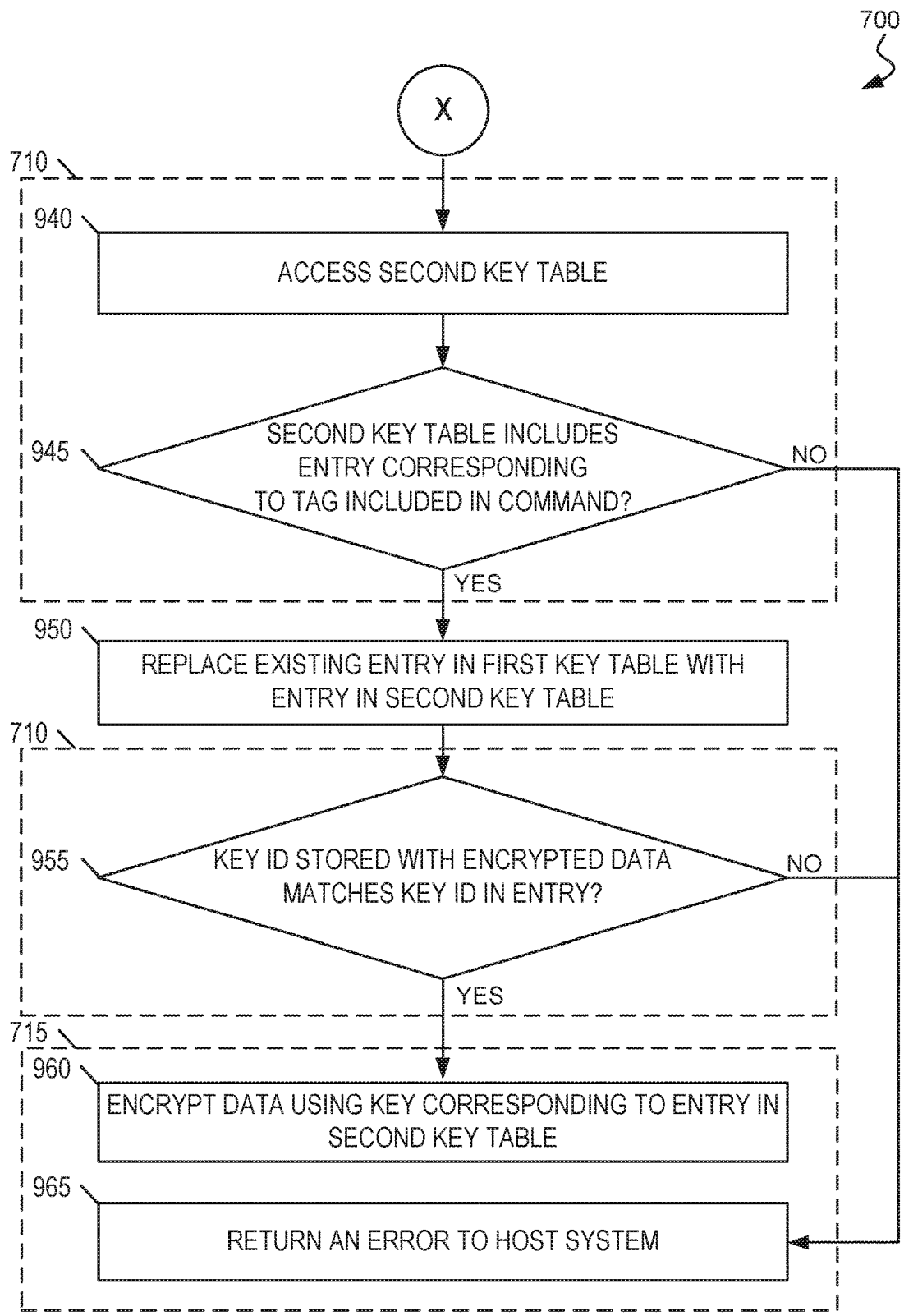

As shown in FIGS. 9A and 9B, the method 700 can include operations 905, 910, 915, 920, 925, 930, 935, 940, 945, 950, 955, 960, and 965. Consistent with these embodiments: the operation 905 can be performed as part of the operation 705, where the processing device receives a command to perform a data operation; the operations 915, 920, 925, 940, 945, and 955 can be performed as part of the operation 710, where the processing device identifies the encryption key corresponding the key tag in the command; and any one of the operations 930, 935, 960, or 965 can be performed as part of the operation 715, where the processing device processes the command.

At operation 905, the processing device receives a command to read data from a memory device (e.g., the memory device 130). The command includes a key tag associated with an encryption key. In response to the command, the processing device reads encrypted data along with a corresponding encryption key identifier, at operation 910.

The processing device, at operation 915, accesses a first key table (e.g., hardware key table 500) from local memory (e.g., the local memory 119). The first key table comprises a first set of key entries corresponding to a first set of encryption keys. Each key entry in the first set of key entries includes an encryption key, an identifier of the encryption key, and a tag associated with the encryption key.

The processing device searches the first key table, at operation 920, to determine whether the first key table incudes a key entry that corresponds to the key tag included in the write command. Based on identifying a key entry in the first key table that matches the key tag, the processing device determines whether the key identifier stored with the encrypted data matches a key identifier included in the key entry, at operation 925. If the key identifiers do not match, the processing device returns an error in response to the command, at operation 930.

If the key identifiers match, the processing device decrypts the data using an encryption key corresponding to the matching entry in the first key table, at operation 935.

With reference to FIG. 9B, based on determining that the first key table does not include an entry that corresponds to the key tag, the processing device accesses a second key table (e.g., RAM key table 550) from RAM, at operation 940. The second key table includes a second set of key entries corresponding to a second set of encryption keys. As with the first set of key entries, each key entry in the second set of key entries includes an encryption key, an identifier of the encryption key, and a tag associated with the encryption key.

At operation 945, the processing device searches the second key table to determine whether the second key table incudes a key entry that corresponds to the key tag included in the read command. Based on identifying a key entry in the second key table that matches the key tag, the processing device replaces an existing entry in the first key table with the identified key entry from the second key table, at operation 950. As an example, the processing device can select the existing key entry to replace based on a recency of use of the corresponding encryption key (e.g., a least recently used entry).

At operation 955, the processing device determines whether the key identifier stored with the encrypted data matches a key identifier included in the key entry. If the keys match, the processing device decrypts the encrypted data using an encryption key corresponding to the key entry identified from the second key table, at operation 960.

If the key identifiers do not match or if the second key table does not include a key entry that matches the key tag included in the command, the processing device returns an error in response to the command, at operation 965.

In view of the disclosure above, various examples are set forth below. It should be noted that one or more features of an example, taken in isolation or combination, should be considered within the disclosure of this application.

Example 1 is a system comprising: a memory device; and a processing device coupled to the memory device, the processing device configured to perform operations comprising: receiving a command to perform a data operation at the memory device, the command comprising an encryption key tag; accessing a first key table from local memory, the first key table comprising a first set of key entries corresponding to a first set of encryption keys; determining whether the first key table includes an entry corresponding to the encryption key tag; based on determining the first key table does not include an entry corresponding to the tag, accessing, from random access memory (RAM), a second key table comprising a second set of key entries corresponding to a second set of encryption keys; identifying, from the second set of key entries, a key entry corresponding to the encryption key tag, the key entry comprising an encryption key corresponding to the encryption key tag; and processing the command using the encryption key.

Example 2 includes the system of Example 1, wherein: the command comprises a command to write data to the memory device; and the processing of the command comprises encrypting the data using the encryption key.

Example 3 includes the system of any one or more of Examples 1 or 2, wherein: the command comprises a command to read data from the memory device; and the processing of the command comprises decrypting, using the encryption key, encrypted data read from the memory device.

Example 4 includes the system of any one or more of Examples 1-3, wherein the operations further comprise: reading the encrypted data and a key identifier from the memory device; and determining that the key identifier read from the memory device matches a key identifier included in the key entry.

Example 5 includes the system of any one or more of Examples 1-4, wherein: the command is a first command to perform a first data operation; the encryption key tag is a first encryption key tag; the encryption key is a first encryption key; and the operations further comprise: receiving a second command to perform a second data operation at the memory device, the second command comprising a second encryption key tag.

Example 6 includes the system of any one or more of Examples 1-5, wherein the operations further comprise: determining the first key table includes a key entry corresponding to the second encryption key tag, the key entry corresponding to the second encryption key tag comprising a second encryption key; and processing the second command using the second encryption key.

Example 7 includes the system of any one or more of Examples 1-6, wherein: the second command comprises a command to read data from the memory device; and the operations further comprise: reading encrypted data and a key identifier from the memory device; and determining that the key identifier read from the memory device matches a key identifier included in the key entry.

Example 8 includes the system of any one or more of Examples 1-7, wherein the operations further comprise: returning an error responsive to the second command based on determining that the first key table and second key table do not include a key entry corresponding to the second encryption key tag.

Example 9 includes the system of any one or more of Examples 1-8, wherein: the second command comprises a command to read data from the memory device; and the operations further comprise: reading encrypted data and a key identifier from the memory device; determining the first key table includes a key entry corresponding to the second encryption key tag, the key entry corresponding to the second encryption key tag comprising a second encryption key; and returning an error responsive to the second command based on determining that the key identifier read from the memory device does not match a key identifier included in the key entry corresponding to the second encryption key tag.

Example 10 includes the system of any one or more of Examples 1-9, wherein the operations further comprise: determining the first key table does not include a key entry corresponding to the second encryption key tag; identifying a key entry from the second key table that corresponds to the second encryption key tag; and replacing an existing key entry in the first key table with the key entry from the second key table that corresponds to the second encryption key tag.

Example 11 is a method comprising: receiving, at a processing device, a command to perform a data operation at a memory device, the command comprising an encryption key tag; accessing a first key table from local memory of the processing device, the first key table comprising a first set of key entries corresponding to a first set of encryption keys; searching, by the processing device, the first key table to determine whether the first key table includes an entry corresponding to the encryption key tag; accessing, from random access memory (RAM), a second key table comprising a second set of key entries in response to determining the first key table does not include an entry corresponding to the tag; identifying, from the second set of key entries, a key entry corresponding to the encryption key tag, the key entry comprising an encryption key corresponding to the encryption key tag; and processing, by the processing device, the command using the encryption key.

Example 12 includes the method of Example 11, wherein: the command comprises a command to write data to the memory device; and the processing of the command comprises encrypting the data using the encryption key.

Example 13 includes the method of any one or more of Examples 11 or 12, wherein: the command comprises a command to read data from the memory device; and the processing of the command comprises decrypting, using the encryption key, encrypted data read from the memory device.

Example 14 includes the method of any one or more of Examples 11-13, and further includes: reading the encrypted data and a key identifier from the memory device; and determining that the key identifier read from the memory device matches a key identifier included in the key entry.

Example 15 includes the method of any one or more of Examples 11-14, wherein: the command is a first command to perform a first data operation; the encryption key tag is a first encryption key tag; the encryption key is a first encryption key; and the method further comprises: receiving a second command to perform a second data operation at the memory device, the second command comprising a second encryption key tag.

Example 16 includes the method of any one or more of Examples 11-15, and further includes: determining the first key table includes a key entry corresponding to the second encryption key tag, the key entry corresponding to the second encryption key tag comprising a second encryption key; and processing the second command using the second encryption key corresponding to the key entry in the first key table.

Example 17 includes the method of any one or more of Examples 11-16, wherein: the second command comprises a command to read data from the memory device; and the method further comprises: reading encrypted data and a key identifier from the memory device; and determining that the key identifier read from the memory device matches a key identifier included in the key entry.

Example 18 includes the method of any one or more of Examples 11-17, and further includes: returning an error responsive to the second command based on determining that the first key table and second key table do not include a key entry corresponding to the second encryption key tag.

Example 19 includes the method of any one or more of Examples 11-18, wherein the second command comprises a command to read data from the memory device; and the method further comprises: reading encrypted data and a key identifier from the memory device; determining the first key table includes a key entry corresponding to the second encryption key tag, the key entry corresponding to the second encryption key tag comprising a second encryption key; and returning an error in response to the second command in response to determining that the key identifier read from the memory device does not match a key identifier included in the key entry corresponding to the second encryption key tag.

Example 20 is a computer-readable storage medium comprising instructions that, when executed by a processing device, configure the processing device to perform operations comprising: receiving a command to perform a data operation at a memory device, the command comprising an encryption key tag, the data operation comprising a read operation or a write operation; accessing a first key table from local memory, the first key table comprising a first set of key entries corresponding to a first set of encryption keys; determining the first key table does not include an entry corresponding to the encryption key tag; based on determining the first key table does not include an entry corresponding to the tag, accessing, from random access memory (RAM), a second key table comprising a second set of key entries corresponding to a second set of encryption keys; identifying, from the second set of key entries, a key entry corresponding to the encryption key tag, the key entry comprising an encryption key corresponding to the encryption key tag; and processing the command using the encryption key, the processing of the command comprising encrypting or decrypting data using the encryption key.

Figure 10:
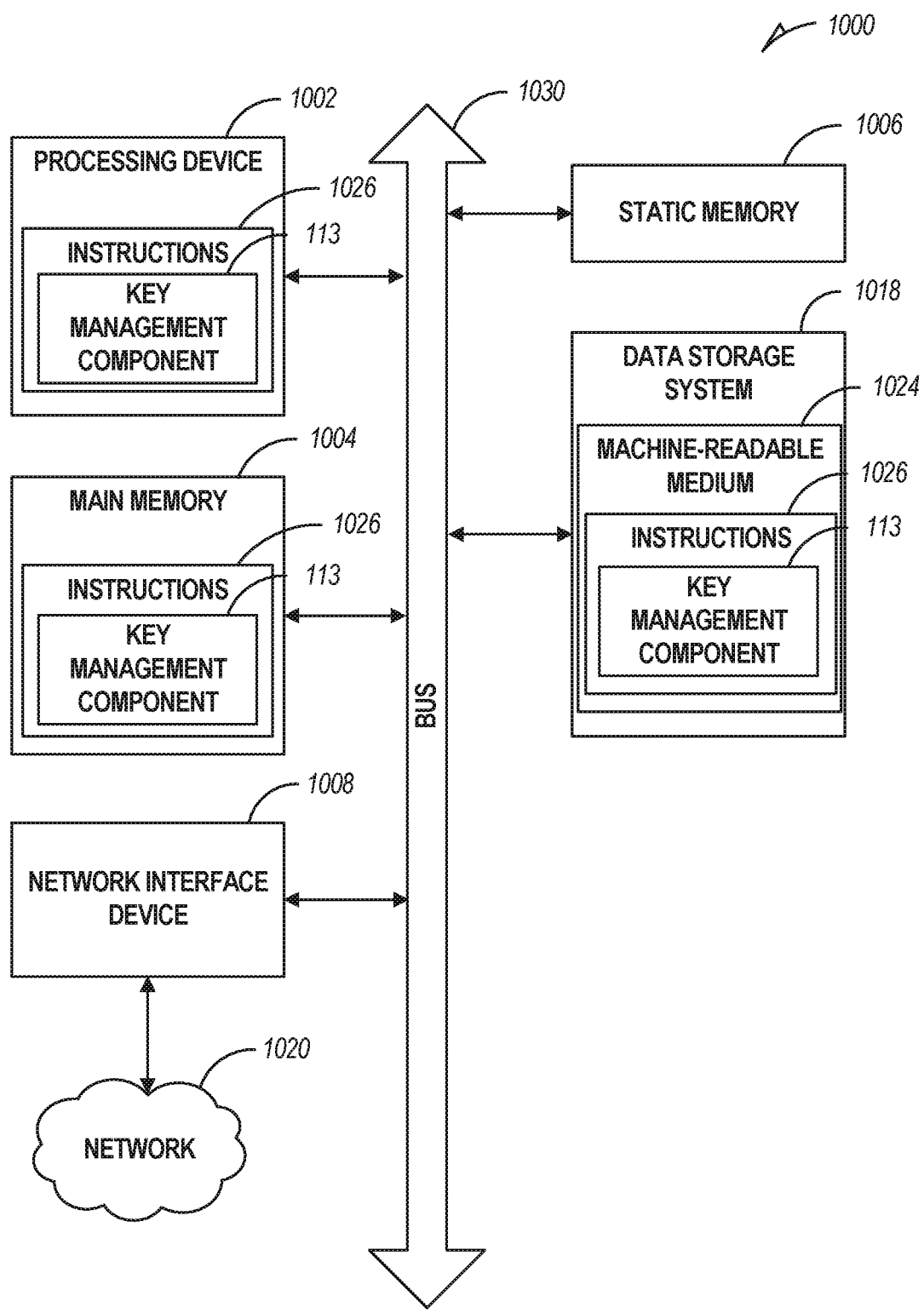
FIG. 10 is a block diagram of an example computer system in which embodiments of the present disclosure may operate.

FIG. 10 illustrates an example machine in the form of a computer system 1000 within which a set of instructions can be executed for causing the machine to perform any one or more of the methodologies discussed herein. FIG. 10 illustrates an example machine in the form of a computer system 1000 within which a set of instructions 1026 can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the key management component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., ROM, flash memory, DRAM such as SDRAM or RDRAM, etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device 1002 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an ASIC, a FPGA, a digital signal processor (DSP), network processor, or the like. The processing device 1002 is configured to execute instructions 1026 for performing the operations and steps discussed herein. The computer system 1000 can further include a network interface device 1008 to communicate over a network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to a security component (e.g., the key management component 113 of FIG. 1). While the machine-readable storage medium 1024 is shown in an example embodiment to be a single medium, the term "machine-readable storage medium" should be taken to include a single medium or multiple media that store the one or more sets of instructions 1026. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device coupled to the memory device, the processing device configured to perform operations comprising:
receiving a command to perform a data operation at the memory device, the command comprising an encryption key tag;
accessing a first key table from local memory, the first key table comprising a first set of key entries corresponding to a first set of encryption keys;
based on determining the first key table does not include an entry corresponding to the encryption key tag, accessing, from random access memory (RAM), a second key table comprising a second set of key entries corresponding to a second set of encryption keys;
identifying, from the second set of key entries, a key entry corresponding to the encryption key tag; and
replacing an existing key entry in the first key table with the key entry from the second key table that corresponds to the encryption key tag.

2. The system of claim 1, wherein:
the key entry from the second key table comprises an encryption key from the second set of encryption keys; and
the operations further comprise processing the command using the encryption key.

3. The system of claim 2, wherein:
the command comprises a command to write data to the memory device; and
the processing of the command comprises encrypting the data using the encryption key.

4. The system of claim 2, wherein the operations further comprise:
reading the encrypted data and a key identifier from the memory device; and
determining that the key identifier read from the memory device matches a key identifier included in the key entry, wherein processing the command is in response to determining that the key identifier read from the memory device matches the key identifier included in the key entry.

5. The system of claim 2, wherein the operations further comprise:
   reading the encrypted data and a key identifier from the memory device; and
   determining that the key identifier read from the memory device does not match a key identifier included in the key entry; and
   returning an error responsive to the command based on determining that the key identifier read from the memory device does not match a key identifier included in the key entry.

6. The system of claim 1, wherein:
   the command is a first command;
   the encryption key tag is a first encryption key tag; and
   the operations further comprise:
   receiving a second command to read data from the memory device, the second command comprising a second encryption key tag; and
   based on the second command, reading encrypted data and a key identifier from the memory device;
   determining the first key table includes an entry corresponding to the second encryption key tag, the entry comprising a second encryption key;
   based on determining that the key identifier read from the memory device matches a key identifier included in the entry in the first key table corresponding to the second encryption key tag, decrypting, using the second encryption key, the encrypted data read from the memory device.

7. The system of claim 1, wherein:
   the command is a first command;
   the encryption key tag is a first encryption key tag; and
   the operations further comprise:
   receiving a second command to read data from the memory device, the second command comprising a second encryption key tag; and
   based on the second command, reading encrypted data and a key identifier from the memory device;
   determining the first key table includes an entry corresponding to the second encryption key tag; and
   returning an error responsive to the second command based on determining that the key identifier read from the memory device does not match a key identifier included in the entry in the first key table corresponding to the second encryption key tag.

8. The system of claim 1, wherein:
   the command is a first command;
   the encryption key tag is a first encryption key tag; and
   the operations further comprise:
   receiving a second command to write data to the memory device, the second command comprising a second encryption key tag; and
   determining the first key table includes an entry corresponding to the second encryption key tag, the entry comprising an encryption key; and
   based on determining the first key table includes the entry corresponding to the second encryption key tag, encrypting the data using the encryption key in the entry of the first key table corresponding to the second encryption key tag.

9. The system of claim 1, wherein:
   the command is a first command;
   the encryption key tag is a first encryption key tag; and
   the operations further comprise:
   receiving a second command to write data to the memory device, the second command comprising a second encryption key tag; and
   based on determining the first key table does not include an entry corresponding to the second encryption key tag, determining whether the second key table includes an entry corresponding to the second encryption key tag;
   based on determining the second key table includes the entry corresponding to the second encryption key tag, encrypting the data using an encryption key in the entry of the second key table corresponding to the second encryption key tag.

10. The system of claim 1, wherein:
    the command is a first command;
    the encryption key tag is a first encryption key tag; and
    the operations further comprise:
    receiving a second command to write data to the memory device, the second command comprising a second encryption key tag; and
    based on determining the first key table does not include an entry corresponding to the second encryption key tag, determining whether the second key table includes an entry corresponding to the second encryption key tag;
    returning an error responsive to the second command based on determining the second key table does not include an entry corresponding to the second encryption key tag.

11. A method comprising:
    receiving a command to perform a data operation at a memory device, the command comprising an encryption key tag;
    accessing a first key table from local memory, the first key table comprising a first set of key entries corresponding to a first set of encryption keys;
    based on determining the first key table does not include an entry corresponding to the encryption key tag, accessing, from random access memory (RAM), a second key table comprising a second set of key entries corresponding to a second set of encryption keys;
    identifying, from the second set of key entries, a key entry corresponding to the encryption key tag; and
    replacing an existing key entry in the first key table with the key entry from the second key table that corresponds to the encryption key tag.

12. The method of claim 11, wherein:
    the key entry from the second key table comprises an encryption key from the second set of encryption keys; and
    the operations further comprise processing the command using the encryption key.

13. The method of claim 12, wherein:
    the command comprises a command to write data to the memory device; and
    the processing of the command comprises encrypting the data using the encryption key.

14. The method of claim 12, further comprising:
    reading the encrypted data and a key identifier from the memory device; and
    determining that the key identifier read from the memory device matches a key identifier included in the key entry, wherein processing the command is in response to determining that the key identifier read from the memory device matches the key identifier included in the key entry.

15. The method of claim 12, further comprising:

reading the encrypted data and a key identifier from the memory device; and determining that the key identifier read from the memory device does not match a key identifier included in the key entry; and returning an error responsive to the command based on determining that the key identifier read from the memory device does not match a key identifier included in the key entry.

16. The method of claim 11, wherein:

the command is a first command;

the encryption key tag is a first encryption key tag; and the method further comprises:

receiving a second command to read data from the memory device, the second command comprising a second encryption key tag; and based on the second command, reading encrypted data and a key identifier from the memory device;

determining the first key table includes an entry corresponding to the second encryption key tag, the entry comprising a second encryption key;

based on determining that the key identifier read from the memory device matches a key identifier included in the entry in the first key table corresponding to the second encryption key tag, decrypting, using the second encryption key, the encrypted data read from the memory device.

17. The method of claim 11, wherein:

the command is a first command;

the encryption key tag is a first encryption key tag; and the method further comprises:

receiving a second command to read data from the memory device, the second command comprising a second encryption key tag; and based on the second command, reading encrypted data and a key identifier from the memory device;

determining the first key table includes an entry corresponding to the second encryption key tag; and returning an error responsive to the second command based on determining that the key identifier read from the memory device does not match a key identifier included in the entry in the first key table corresponding to the second encryption key tag.

18. The method of claim 11, wherein:

the command is a first command;

the encryption key tag is a first encryption key tag; and the method further comprises:

receiving a second command to write data to the memory device, the second command comprising a second encryption key tag; and determining the first key table includes an entry corresponding to the second encryption key tag, the entry comprising an encryption key; and based on determining the first key table includes the entry corresponding to the second encryption key tag, encrypting the data using the encryption key in the entry of the first key table corresponding to the second encryption key tag.

19. The method of claim 11, wherein:

the command is a first command;

the encryption key tag is a first encryption key tag; and the method further comprises:

receiving a second command to write data to the memory device, the second command comprising a second encryption key tag; and based on determining the first key table does not include an entry corresponding to the second encryption key tag, determining whether the second key table includes an entry corresponding to the second encryption key tag;

based on determining the second key table includes the entry corresponding to the second encryption key tag, encrypting the data using an encryption key in the entry of the second key table corresponding to the second encryption key tag.

20. A non-transitory computer-readable storage medium comprising instructions that, when executed by a processing device, configure the processing device to perform operations comprising:

receiving a command to perform a data operation at a memory device, the command comprising an encryption key tag;

accessing a first key table from local memory, the first key table comprising a first set of key entries corresponding to a first set of encryption keys;

based on determining the first key table does not include an entry corresponding to the encryption key tag, accessing, from random access memory (RAM), a second key table comprising a second set of key entries corresponding to a second set of encryption keys;

identifying, from the second set of key entries, a key entry corresponding to the encryption key tag; and replacing an existing key entry in the first key table with the key entry from the second key table that corresponds to the encryption key tag.

* * * * *